United States Patent [19]
Miyake et al.

[11] Patent Number: 5,755,856
[45] Date of Patent: May 26, 1998

[54] PROCESS OF RECOVERING OXYGEN-ENRICHED GAS

[75] Inventors: Masanori Miyake; Kazuo Haruna; Hiroaki Sasano, all of Kako-gun, Japan

[73] Assignee: Sumitomo Seika Chemicals Co. Ltd., Hyogo, Japan

[21] Appl. No.: 737,144

[22] PCT Filed: Feb. 26, 1996

[86] PCT No.: PCT/JP95/00452

§ 371 Date: Oct. 30, 1996

§ 102(e) Date: Oct. 30, 1996

[87] PCT Pub. No.: WO96/26894

PCT Pub. Date: Sep. 6, 1996

[30] Foreign Application Priority Data

Mar. 2, 1995 [JP] Japan ................. 7-042915

[51] Int. Cl.$^6$ ................. B01D 53/047
[52] U.S. Cl. ................. 95/101; 95/102; 95/105; 95/130
[58] Field of Search ................. 95/96–106, 130

[56] References Cited

U.S. PATENT DOCUMENTS

| | | | |
|---|---|---|---|
| 3,564,816 | 2/1971 | Batta | 95/130 X |
| 3,636,679 | 1/1972 | Batta | 95/130 X |
| 3,738,087 | 6/1973 | McCombs | 95/98 |
| 3,880,616 | 4/1975 | Myers et al. | 95/130 X |
| 4,264,340 | 4/1981 | Sircar et al. | 95/130 X |
| 4,589,888 | 5/1986 | Hiscock et al. | 95/130 X |
| 4,650,500 | 3/1987 | Patel | 95/100 |
| 4,781,735 | 11/1988 | Tagawa et al. | 95/130 X |
| 4,917,710 | 4/1990 | Haruna et al. | 95/130 X |
| 4,969,935 | 11/1990 | Hay | 95/98 |
| 5,015,271 | 5/1991 | Reiss | 95/96 X |
| 5,015,272 | 5/1991 | Okada et al. | 95/100 X |
| 5,122,164 | 6/1992 | Hirooka et al. | 95/130 X |
| 5,203,888 | 4/1993 | Maurer | 95/101 |
| 5,223,004 | 6/1993 | Etéve et al. | 95/98 |
| 5,232,473 | 8/1993 | Kapoor et al. | 95/101 |
| 5,429,666 | 7/1995 | Agrawal et al. | 95/102 X |
| 5,518,526 | 5/1996 | Baksh et al. | 95/130 X |
| 5,529,611 | 6/1996 | Monereau et al. | 95/101 |
| 5,536,299 | 7/1996 | Girard et al. | 95/130 X |
| 5,540,758 | 7/1996 | Agrawal et al. | 95/102 X |
| 5,549,733 | 8/1996 | Marot et al. | 95/101 X |

FOREIGN PATENT DOCUMENTS

| | | | |
|---|---|---|---|
| 0 354 259 | 2/1990 | European Pat. Off. | B01D 53/04 |
| 0 449 448 A1 | 10/1991 | European Pat. Off. | B01D 53/04 |
| 63-103805 | 5/1988 | Japan | C01B 21/04 |
| 63-111916 | 5/1988 | Japan | B01D 53/04 |
| 63-240914 | 10/1988 | Japan | B01D 53/04 |
| 1-236914 | 9/1989 | Japan | B01D 53/04 |
| 2-119915 | 5/1990 | Japan | B01D 53/04 |
| 4-222613 | 8/1992 | Japan | B01D 53/04 |
| 4-505448 | 9/1992 | Japan | C01B 13/02 |
| 6-170 | 1/1994 | Japan | B01D 53/04 |
| 6-55027 | 3/1994 | Japan | B01D 53/04 |

*Primary Examiner*—Robert Spitzer
*Attorney, Agent, or Firm*—Michael D. Bednarek; Kilpatrick Stockton LLP

[57] ABSTRACT

In a process of recovering oxygen-enriched gas by pressure swing adsorption with use of adsorbers (A, B) each packed with an adsorbent which selectively adsorbs nitrogen from a gas mixture mainly containing nitrogen and oxygen, recovery of remaining oxygen-enrich gas is fully carried out by pressure equalization between both adsorbers (A, B), and a vacuum pump (8) is always connected to either adsorber (A or B) for continuous evacuation of nitrogen. For this purpose, the pressure equalization between both adsorbers (A, B) is conducted at least in two steps wherein one adsorber (A or B) is pressurized, whereas the other adsorber (B or A) is pressurized, so that recovery of oxygen-enriched gas is possible until there is substantially no pressure difference between both adsorbers (A, B).

5 Claims, 7 Drawing Sheets

Fig. 2

| Step | 1 | 2 | 3 | 4 | 5 | 6 | 7 | 8 |
|---|---|---|---|---|---|---|---|---|
| Op. Time (s) | 10 | 4 | 2 | 44 | 10 | 4 | 2 | 44 |
| Adsorber (A) | PZ 1 | PZ 2 | PZ 3 | AS | DP 1 | DP 2 | | DS |
| Adsorber (B) | DP 1 | DP 2 | | DS | PZ 1 | PZ 2 | PZ 3 | AS |

Fig. 4

| Step | 1 | 2a | 2 | 3 | 4 | 5 | 6a | 6 | 7 | 8 |
|---|---|---|---|---|---|---|---|---|---|---|
| Op. Time (s) | 8 | 2 | 4 | 2 | 44 | 8 | 2 | 4 | 2 | 44 |
| Adsorber (A) | PZ 1 | PZ 2a | PZ 2 | PZ 3 | AD | DP 1 | DP 2 | | | DS |
| Adsorber (B) | DP 1 | | DP 2 | | DS | PZ 1 | PZ 2a | PZ 2 | PZ 3 | AD |

Fig. 8

| Op. Time (s) | 10 | 6 | 44 | 10 | 6 | 44 |
|---|---|---|---|---|---|---|
| Adsorber (A) | PZ 1 | PPZ | AS | DP 1 | DS | |
| Adsorber (B) | DP 1 | DS | | PZ 1 | PPZ | AS |

1 cycle (120s)

Fig. 9

| Op. Time (s) | 9 | 9 | 27 | 9 | 9 | 27 |
|---|---|---|---|---|---|---|
| Adsorber (A) | PZ 1 | PZ 2 | AS | DP 1 | DS | |
| Adsorber (B) | DP 1 | DS | | PZ 1 | PZ 2 | AS |

1 cycle (90 s)

PROCESS OF RECOVERING OXYGEN-ENRICHED GAS

TECHNICAL FIELD

The present invention relates to a process of recovering oxygen-enriched gas. More specifically, the present invention relates to a process for enriching and recovering oxygen by pressure swing adsorption (hereinafter referred to as "PSA") of a gas mixture which mainly contains nitrogen and oxygen.

BACKGROUND ART

Oxygen obtained by a PSA process is widely used in industrial fields which continuously use oxygen. Specific examples which require use of oxygen obtained by a PSA process include electric steel making, oxygen aeration in water treatment, pulp bleaching, and ozonizers. In recent years, further, oxygen-enriched gas takes the place of air in combustion for realizing a NOx reduction and an efficiency improvement. In addition, oxygen-enriched gas is also utilized in the field of biochemistry such as fermentation.

There are various prior art PSA processes for enriching oxygen, wherein 2–4 adsorbers are used to repetitively perform adsorption, depressurization, desorption and pressurization for obtaining enriched gas at a high recovery yield. In particular, various improvements have been made to lower initial cost, running cost and maintenance cost with respect to PSA utilizing two adsorbers.

For instance, according to the PSA process disclosed in each of Japanese Patent Application Laid-open Nos. 1-236914, 2-119915, 4-222613 and 4-505448, product oxygen from a product gas storage tank is made to flow reversely into each adsorber for pressurization in a pressurization step. This is because if the pressurization is performed solely by feeding of the gas mixture through the inlet end of each adsorber, nitrogen contained in the gas mixture may break through the outlet end of the adsorber. Thus, it was conventionally considered essential, for obtainment of high-concentration oxygen at a high yield, to prevent such a breakthrough by causing product oxygen to flow reversely through the outlet end of the adsorber.

However, reverse flow of product oxygen for pressurization of the adsorber entails a waste of energy. This is because product gas once forced out of the adsorber into the product oxygen gas storage tank by consuming of energy must be made to flow reversely into the adsorber in the pressurization step and then return into the storage tank again.

On the other hand, a PSA process which does not utilize product oxygen for pressurization is known from Japanese Patent Publication No. 6-170. According to this known PSA process, an outlet end of an adsorber having completed adsorption is brought into conduction with an outlet end of another adsorber having completed desorption via a pressure equalization line to introduce remaining oxygen-enriched gas emitted from the depressurizing adsorber into the pressurizing adsorber for pressurization (equalizing pressurization), thereby taking the place of pressurization by reverse flow of product oxygen. Subsequently, the adsorber having undergone equalizing pressurization is subjected to pressurization by feeding the gas mixture, whereas the adsorber having undergone equalizing depressurization is subjected to evacuating desorption (depressurizing desorption) by a vacuum pump.

However, according to the latter PSA process, the vacuum pump is idly operated in the pressurization step by pressure equalization between both adsorbers, so that the energy of the vacuum pump is wasted. Further, the pressure equalization between both adsorbers is not thoroughly performed to the point where there is no pressure difference between both adsorbers, so that the controlled recovery of remaining oxygen-enriched gas determines the degree to which the pressuring adsorber is pressurized. Thus, the remaining oxygen-enriched gas is insufficiently recovered and utilized.

DISCLOSURE OF THE INVENTION

Therefore, an object of the present invention is to provide a process which is capable of effectively utilizing the energy of a vacuum pump while recovering oxygen-enriched gas with a high oxygen concentration at a high yield.

To fulfil the above object, the present invention provides a process of recovering oxygen-enriched gas by pressure swing adsorption with use of a first and a second adsorbers each packed with an adsorbent which selectively adsorbs nitrogen from a gas mixture mainly containing nitrogen and oxygen, the process comprising:

step 1 wherein an outlet end of the first adsorber under a minimum pressure is brought into conduction with an outlet end of the second adsorber under a maximum pressure via a pressure equalization line to introduce remaining oxygen-enriched gas emitted from the second adsorber undergoing depressurization into the first adsorber for pressurization and recovery, desorbed nitrogen being evacuated through an inlet end of the first adsorber by a vacuum pump;

step 2 wherein while maintaining the conduction between the outlet end of the first adsorber and the outlet end of the second adsorber via the pressure equalization line, remaining oxygen-enriched gas further emitted from the second adsorber undergoing depressurization is introduced into the first adsorber for further pressurization and recovery, the gas mixture being introduced through the inlet end of the first adsorber, desorbed nitrogen being evacuated through an inlet end of the second adsorber by the vacuum pump;

step 3 wherein the outlet end of the first adsorber and the outlet end of the second adsorber are held closed, and the gas mixture is introduced through the inlet end of the first adsorber for further pressurization of the first adsorber, desorbed nitrogen being further evacuated through the inlet end of the second adsorber by the vacuum pump;

step 4 wherein the outlet end of the first adsorber is held open with the outlet end of the second adsorber held closed, and the gas mixture is introduced through the inlet end of the first adsorber for ultimate pressurization to the maximum pressure to take out oxygen-enriched gas from the outlet end of the first adsorber, desorbed nitrogen being evacuated through the inlet end of the second adsorber by the vacuum pump until the minimum pressure is reached;

step 5 wherein the outlet end of the first adsorber under the minimum pressure is brought again into conduction with the outlet end of the second adsorber under the maximum pressure via the pressure equalization line to introduce remaining oxygen-enriched gas emitted from the first adsorber undergoing depressurization into the second adsorber for pressurization and recovery, desorbed nitrogen being evacuated through the inlet end of the second adsorber by the vacuum pump;

step 6 wherein while maintaining the conduction between the outlet end of the first adsorber and the outlet end of the second adsorber via the pressure equalization line, remaining oxygen-enriched gas further emitted from the first adsorber undergoing depressurization is introduced into the second adsorber for further pressurization and recovery, the gas mixture being introduced through the inlet end of the second adsorber, desorbed nitrogen being evacuated through the inlet end of the first adsorber by the vacuum pump;

step 7 wherein the outlet end of the first adsorber and the outlet end of the second adsorber are held closed, and the gas mixture is introduced through the inlet end of the second adsorber for further pressurization of the second adsorber, desorbed nitrogen being further evacuated through the inlet end of the first adsorber by the vacuum pump; and step 8 wherein the outlet end of the second adsorber is held open with the outlet end of the first adsorber held closed, and the gas mixture is introduced through the inlet end of the second adsorber for ultimate pressurization to the maximum pressure to take out oxygen-enriched gas from the outlet end of the second adsorber, desorbed nitrogen being evacuated through the inlet end of the first adsorber by the vacuum pump until the minimum pressure is reached.

The pressure balance with respect to adsorption and desorption depends on the characteristics and performance of the adsorbent. Generally, however, the maximum (adsorption) pressure may be 0.1–1.0 kg/cm$^2$G (111–199 kPa), preferably 0.3–0.7 kg/cm$^2$G (131–170 kPa), whereas the minimum (desorption) pressure may be 150–400 Torr (20–53 kPa), preferably 200–350 Torr (27–47 kPa).

According to a preferred embodiment of the present invention, step 2a is inserted between the step 1 and the step 2 wherein while maintaining the conduction between the outlet end of the first adsorber and the outlet end of the second adsorber via the pressure equalization line with the inlet end of the first adsorber held closed, the remaining oxygen-enriched gas further emitted from the second adsorber under depressurization is introduced into the first adsorber for further pressurization and recovery, desorbed nitrogen being evacuated through the inlet end of the second adsorber by the vacuum pump. Further, step 6a is inserted between the step 5 and the step 6 wherein while maintaining the conduction between the outlet end of the first adsorber and the outlet end of the second adsorber via the pressure equalization line with the inlet end of the second adsorber held closed, the remaining oxygen-enriched gas further emitted from the first adsorber under depressurization is introduced into the second adsorber for further pressurization and recovery, desorbed nitrogen being evacuated through the inlet end of the first adsorber by the vacuum pump.

The present invention has two significant features. The first feature resides in that pressurization by reverse flow of the product oxygen is not carried out (though a storage tank for product oxygen gas may be provided as long as the product oxygen is not used for reverse-flow pressurization). Conventionally, the pressurization of the adsorber having completed desorption is performed by reverse flow of product oxygen from the storage tank. According to the present invention, by contrast, a corresponding amount of product gas is recovered from an adjacent adsorber which has finished adsorption. As a result, the oxygen recovery yield as a whole is advantageously increased.

The second feature resides in that recovery of oxygen-enriched gas is thoroughly performed by pressure equalization between both adsorbers. This feature is realized by conducting pressurization of each adsorber at least in three steps (steps 1–3 and 5–7 above). According to the process disclosed in Japanese Patent Publication No. 6-170, recovery of oxygen-enriched gas (pressure equalization) is performed only in one step by connecting the outlet ends of both adsorbers, so that a shift to the next process step occurs while there is still a pressure difference between both adsorbers. According to the present invention, by contrast, recovery of oxygen-enriched gas is performed stepwise in two or three steps, so that pressure equalization occurs to a full extent until there is substantially no pressure difference between both adsorbers. In particular, the step 2a inserted between the steps 1 and 2 is effective for recovery of oxygen-enriched gas without losses of oxygen-enriched gas because if the pressure equalization of the step 1 is made to proceed excessively in an attempt to increase the oxygen recovery yield, the recovered oxygen-enriched gas may escape into the discharge line. As a result, it becomes possible to remarkably increase the oxygen recovery yield and the obtainable oxygen amount per unit amount of adsorbent.

During pressurization of one adsorber by pressure equalization, oxygen-enriched gas introduced from the other adsorber contains a small amount of nitrogen desorbed under depressurization. However, the small amount of nitrogen can be sufficiently adsorbed by the regenerated adsorbent near the outlet end of said one adsorber. Because of this, nitrogen contained in the gas mixture subsequently introduced into said one adsorber is adsorbed by its adsorbent progressively from the inlet end, so that nitrogen will not be discharged into the product gas and therefore will not be detrimental to oxygen enrichment. Thus, there is no need for utilizing product oxygen for pressurization, as opposed to the prior art process. As a result, it is possible to avoid a waste of energy by halving the energy required for forwardly and backwardly moving product oxygen between each adsorber and the product oxygen gas storage tank.

Further, according to the present invention, since the vacuum pump is continuously utilized for desorbing evacuation of the adsorbers throughout the entire process, the energy of the vacuum pump can be effectively utilized, as opposed to the process of Japanese Patent Publication No. 6-170 wherein the vacuum pump is idly operated.

The outlet end of the first adsorber and the outlet end of the second adsorber may be always held in mutual conduction via an equalization bypass line provided with a throttling device. The technical significance of this feature will be described hereinafter.

Further, feeding of the gas mixture to the adsorber undergoing pressurization may be performed both by forcible feed utilizing a pressurizing supply means and by natural feed utilizing atmospheric pressure in the steps 2, 3, 6 and 7. The technical significance of this feature will also be described hereinafter.

Other objects and advantages of the present invention will become apparent from the following description of the embodiments given with reference to the accompanying drawings.

BRIEF DESCRIPTION OF THE DRAWINGS

FIG. 2 is a time chart illustrating the process steps of Example 1 of the present invention;

FIG. 4 is a time chart illustrating the process steps of Example 2 of the present invention;

FIG. 8 is a time chart illustrating the process steps of Comparative Example 1; and FIG. 9 is a time chart illustrating the process steps of Comparative Example 2.

BEST MODE FOR CARRYING OUT THE INVENTION

Preferred embodiments of the present invention will be described below with reference to the accompanying drawings.

(Apparatus Arrangement)

Figure 1:
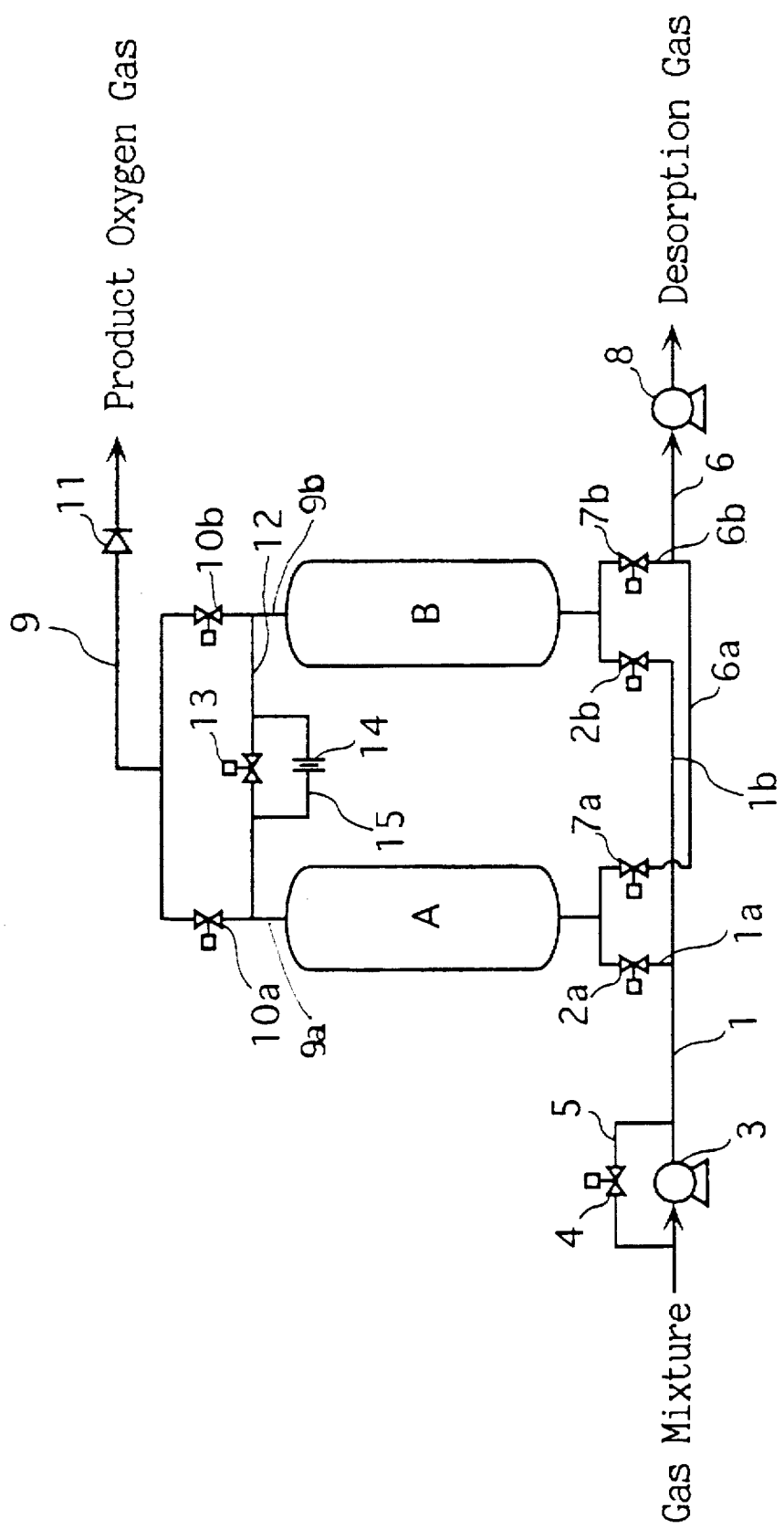
FIG. 1 is a view schematically showing the arrangement of an apparatus for performing a process of recovering oxygen-enriched gas according to the present invention.

FIG. 1 shows an example of apparatus arrangement used for performing a process of recovering oxygen-enriched gas according to the present invention.

In the same figure, reference signs A and B represent respective adsorbers (first and second adsorbers referred to in the claims). Each of the adsorbers A, B is packed with an adsorbent (e.g. CaA-type zeolite) which is suitable for selectively adsorbing nitrogen from a gas mixture (normally, air) mainly containing oxygen and nitrogen. The respective adsorbers A, B are connected, at their respective bottom, to a common feed line 1 via feed-side branch lines 1a, 1b which are provided with switching valves (on-off valves) 2a, 2b, respectively. The feed line 1 is provided with a mixture gas blower 3 for selectively supplying the gas mixture to the adsorber A or B through the open switching valve 2a or 2b.

A feed bypass line 5 with a switching valve 4 may be provided to circumvent the mixture gas blower 3. By this arrangement, the natural feed pressure of the gas mixture itself may be utilized in addition to the blower 3 for feeding the gas mixture when the natural feed pressure (i.e., atmospheric pressure) of the gas mixture becomes higher than the pressure of the respective adsorber A or B (i.e., when the pressure of the respective adsorber A or B becomes negative). As a result, the capacity of the blower 3 can be correspondingly reduced to realize a decrease of energy consumption. It should be appreciated, however, that the feed bypass line 5 is only a preferred element, and that a different natural feed means may be adopted in place of the feed bypass line.

The adsorbers A, B are also connected, at their respective bottom, to a common discharge line 6 via discharge-side branch lines 6a, 6b which are provided with switching valves 7a, 7b, respectively. The discharge line 6 is provided with a vacuum pump 8 for selectively evacuating the respective adsorber A or B through the open switching valve 7a or 7b.

On the other hand, the adsorbers A, B are connected, at their respective top, to a common take-out line 9 for taking out product oxygen gas via separate outlet lines 9a, 9b. Each of the outlet lines 9a, 9b is provided with a respective switching valve 10a, 10b, whereas the take-out line 9 is provided with a reverse-flow preventing device 11 (e.g. check valve). Thus, the product oxygen gas can be selectively taken out from each of the adsorbers A, B by selectively opening and closing the respective switching valve 10a, 10b, whereas reverse flow of the product oxygen gas can be prevented by the reverse-flow preventing device 11.

It should be noted that, instead of providing the reverse-flow preventing device 11, the switching valve 10a, 10b of the respective outlet line 9a, 9b may serve as a reverse-flow preventing device by controlling the on-off timing thereof.

The separate outlet lines 9a, 9b are connected to each other by a pressure equalization line 12 which is provided with a switching valve 13. Further, an equalization bypass line 15 with a throttling device 14 is provided to circumvent the switching valve 13 of the pressure equalization line 12. Thus, even if the switching valve 13 is closed, a small amount of gas flows between both adsorbers A, B through the equalization bypass line 15 (for the technical advantages to be described hereinafter) as long as there is a pressure difference between both adsorbers A, B. Use is normally made of an orifice as the throttling device, but a throttling valve such as a needle valve may be used to obtain the same result. It should be appreciated that the throttling device 14 is only a preferred element.

The process of recovering oxygen-enriched gas according to the present invention may be carried out in the following manner with the use of the apparatus described above. In any of the following embodiments, each of the adsorbers A, B is 600 mm in diameter and 2,500 mm in height, and is packed with CaA-type zeolite as an adsorbent.

(Embodiment 1)

Figure 3:
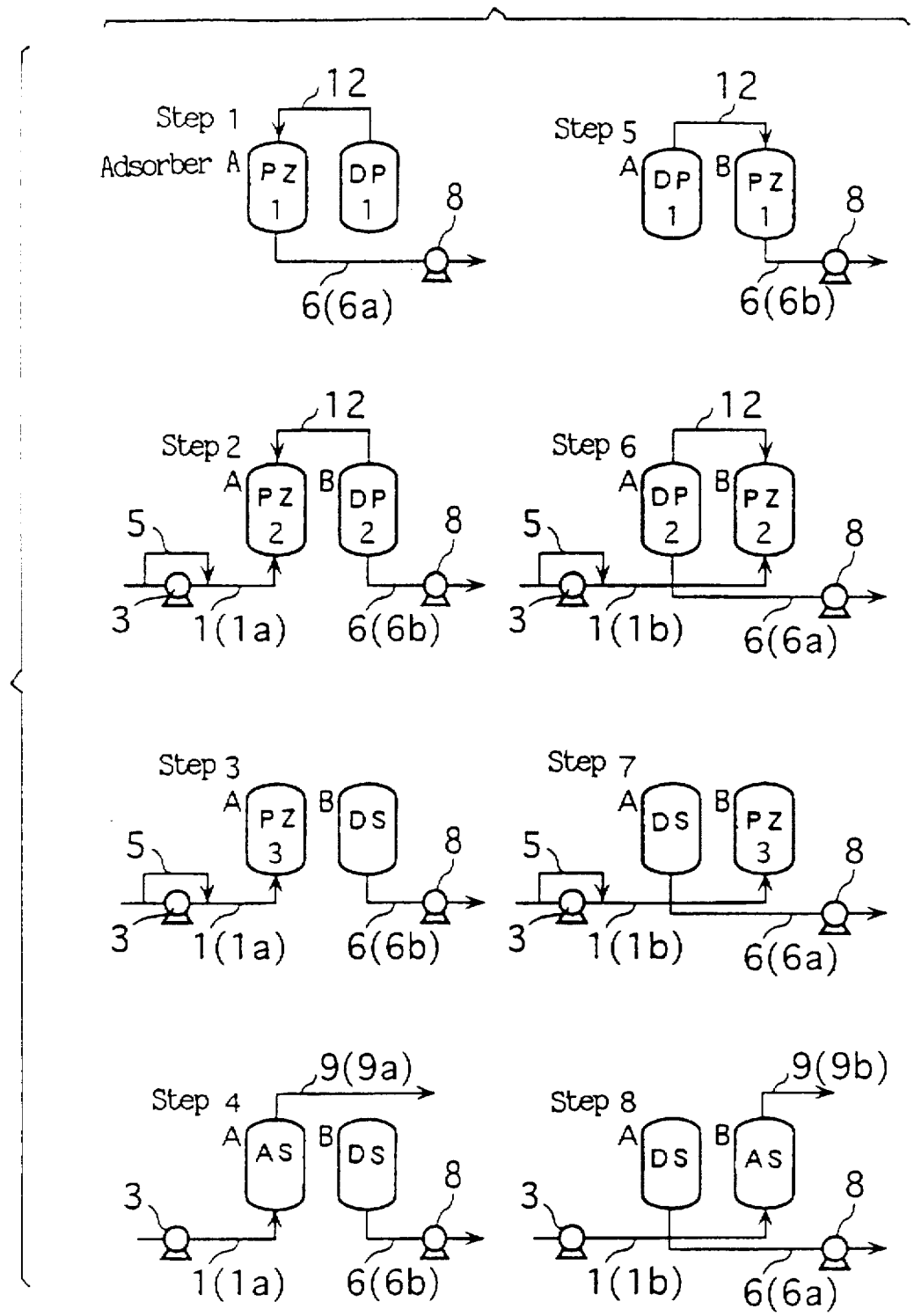
FIG. 3 is a flow diagram illustrating the respective process steps of Example 1 of the present invention.

FIGS. 2 and 3 correspond to Embodiment 1 of the present invention. FIG. 2 is a process chart which shows all of the process steps with time, whereas FIG. 3 is a flow diagram which illustrates the gas flow for the respective process steps. The abbreviations used in FIGS. 2 and 3 are defined as follows, and these abbreviations also apply to FIGS. 4–6, 8 and 9 to be described hereinafter.

AS: Adsorption
DS: Desorption
PZ: Pressurization
DP: Depressurization

For the convenience of description, it is now assumed that the adsorber A has completed desorption to have a lowest pressure of e.g. 150–400 Torr (20–53 kPa), whereas the adsorber B has completed adsorption to have a highest pressure of e.g. 0.1–1.0 kg/cm$^2$G (111–199 kPa). Further, in Embodiment 1, the equalization bypass line 15 (FIG. 1) with the throttling device 14 is not provided.

Under the above-described conditions, in step 1, pressurization 1 is performed with respect to the adsorber A, while depressurization 1 is carried out with respect to the adsorber B. Specifically, in the step 1, only the switching valves 7a, 13 (FIG. 1) are held open to admit remaining oxygen-enriched gas from the adsorber B into the top of the adsorber A via the pressure equalization line 12, the remaining oxygen-enriched gas containing a small amount of nitrogen which has desorbed from the adsorbent of the adsorber B. On the other hand, remaining desorbed nitrogen is evacuated by the vacuum pump 8 through the bottom of the adsorber A for discharge via the discharge-side branch line 6a and the discharge line 6.

Since the adsorber A has already undergone desorption, a small amount of nitrogen introduced from the adsorber B in step 1 is effectively adsorbed by the adsorbent near the top of the adsorber A. Thus, viewed with respect to the adsorbent of the adsorber A as a whole, there will be no great influence on subsequent adsorption of nitrogen from the gas mixture.

On the other hand, the remaining oxygen-enriched gas introduced from the adsorber B into the adsorber A together with a small amount of nitrogen effectively washes the adsorbent of the adsorber A. At this time, since the amount of evacuation by the vacuum pump 8 is smaller than the amount of gas flowing into the adsorber A from the adsorber B, the adsorber A undergoes pressurization to a certain degree. In addition, due to the capacity of the adsorber A itself, the remaining oxygen gas from the adsorber B will not be evacuated to a point of discharge from the adsorber A toward the vacuum pump 8.

The above-described step 1 continues for 10 seconds for example. As a result, the adsorber A is pressurized to e.g. 200–500 Torr (27–67 kPa), while the adsorber B is depressurized to 700 Torr-0.2 kg/cm$^2$G (93–121 kPa).

In following step 2, only the switching valves 2a, 4, 7b, 13 (FIG. 1) are held open. Due to this, the adsorber A undergoes pressurization 2, whereas the adsorber B undergoes depressurization 2. More specifically, remaining oxygen-enriched gas containing a small amount of nitrogen from the adsorber B continues to be introduced into the adsorber A through the top thereof via the pressure equalization line 12, whereas the gas mixture is supplied to the adsorber A through the bottom thereof via the feed-side branch line 1a and the feed line 1. At this time, since the adsorber A is held below the atmospheric pressure, natural feed via the feed bypass line 5 also takes place in addition to forcible feed by the blower 3. Further, a small amount of nitrogen from the adsorber B is effectively captured by the adsorbent near the top of the adsorber A in the same manner as in the step 1.

On the other hand, nitrogen desorbed as a result of depressurization in the adsorber B is evacuated by the vacuum pump 8 for discharge via the discharge-side branch line 6b and the discharge line 6.

The above-described step 2 continues for 4 seconds for example. As a result, the adsorber A is pressurized to e.g. 400–700 Torr (53–93 kPa), while the adsorber B is depressurized to 550–760 Torr (73–101 kPa).

In following step 3, only the switching valves 2a, 4, 7b(FIG. 1) are held open. Due to this, the adsorber A undergoes pressurization 3, whereas the adsorber B undergoes desorption. More specifically, the gas mixture is supplied to the adsorber A through the bottom thereof via the feed-side branch line 1a and the feed line 1, whereas the adsorber B continues to undergo desorption of nitrogen under depressurization by the vacuum pump 8 for discharge via the discharge-side branch line 6b and the discharge line 6. At this time, since the adsorber A is still held below the atmospheric pressure, natural feed via the feed bypass line 5 also takes place in addition to forcible feed by the blower 3.

The above-described Step 3 continues for 2 seconds for example. As a result, the adsorber A is pressurized to e.g. the atmospheric pressure (101 kPa). On the other hand, the desorption of the adsorber B is not completed in this step 3.

In following step 4, only the switching valves 2a, 7b, 10a (FIG. 1) are held open. Due to this, the adsorber A undergoes adsorption, whereas the adsorber B continues to undergo desorption. More specifically, the gas mixture is supplied to the adsorber A through the bottom thereof via the feed-side branch line 1a and the feed line 1, whereby nitrogen in the gas mixture is selectively adsorbed by the adsorbent and non-adsorbed oxygen is taken out via the outlet line 9a and the product oxygen gas take-out line 9. On the other hand, the adsorber B continues to undergo desorption of nitrogen under depressurization by the vacuum pump 8 for discharge via the discharge-side branch line 6b and the discharge line 6. At this time, since the adsorber A is held above the atmospheric pressure, only the forcible feed of the gas mixture by the blower 3 takes place.

The above-described Step 4 continues for 44 seconds for example. As a result, the adsorber A reaches the highest pressure of e.g. 0.1–1.0 kg/cm$^2$G (111–199 kPa), whereas the adsorber B reaches the lowest pressure of e.g. 150–400 Torr (20–53 kPa).

Subsequent steps 5–8 are symmetrical to the above-described steps 1–4. Specifically, in the steps 5–8, the operations performed with respect to the adsorber A in the steps 1–4 are conducted with respect to the adsorber B, and the operations performed with respect to the adsorber B are carried out with respect to the adsorber A. Thus, the description of the subsequent steps 5–8 is omitted.

The steps 1–8 above complete a single cycle with a cycle time of e.g. 120 seconds.

In accordance with Embodiment 1 above, air was used as a gas mixture, and a process with a cycle time of 120 seconds was carried out to achieve a maximum pressure (highest adsorption pressure) of 0.4 kg/cm$^2$G (141 kPa) and a minimum pressure (lowest desorption pressure) of 210 Torr (28 kPa). As a result, product oxygen was obtained with an oxygen concentration of 93% at a rate of 19.9 Nm$^3$/H. Further, the oxygen recovery yield was 51%.

(Embodiment 2)

Figure 5:
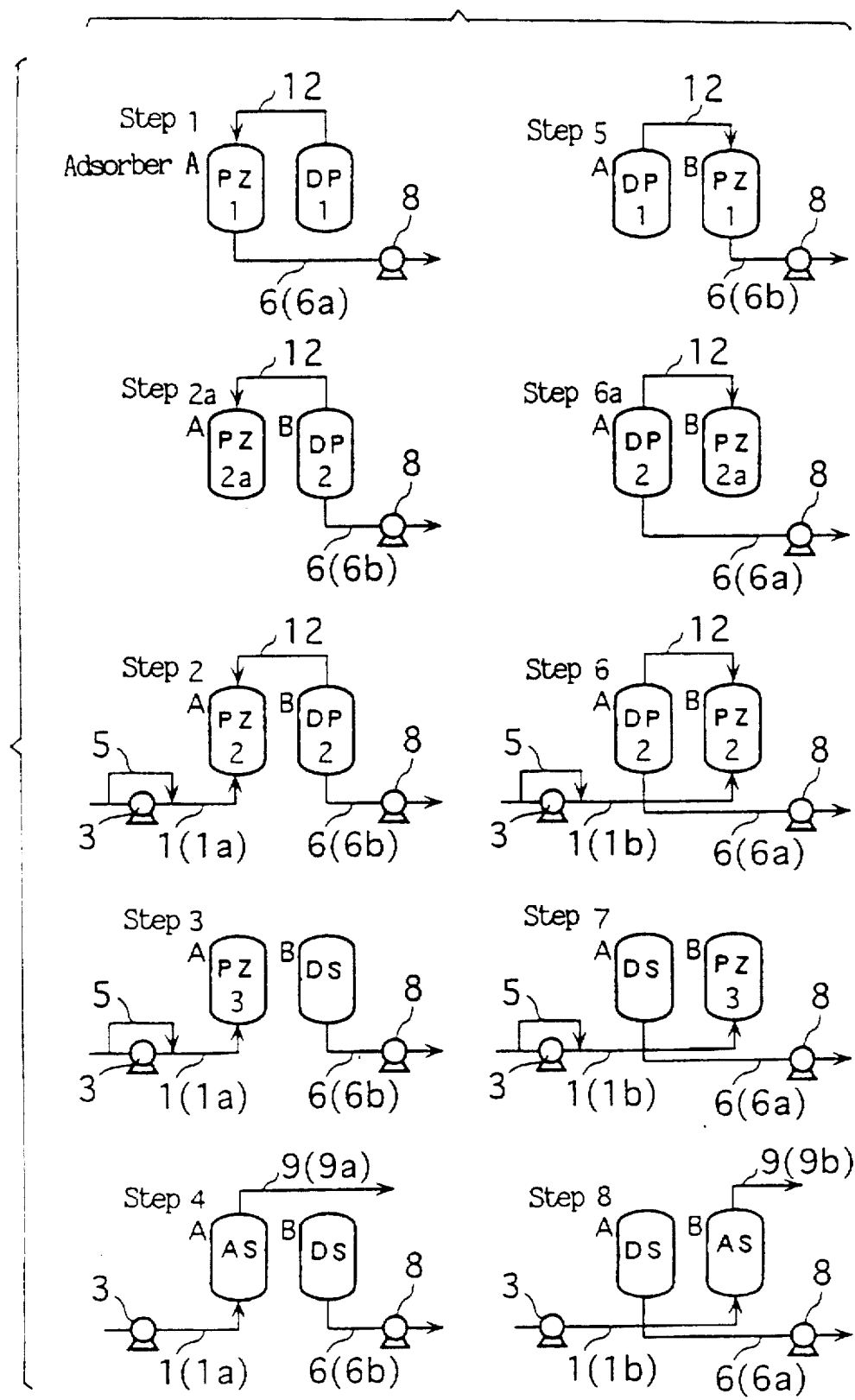
FIG. 5 is a flow diagram illustrating the respective process steps of Example 2 of the present invention.
Figure 6:
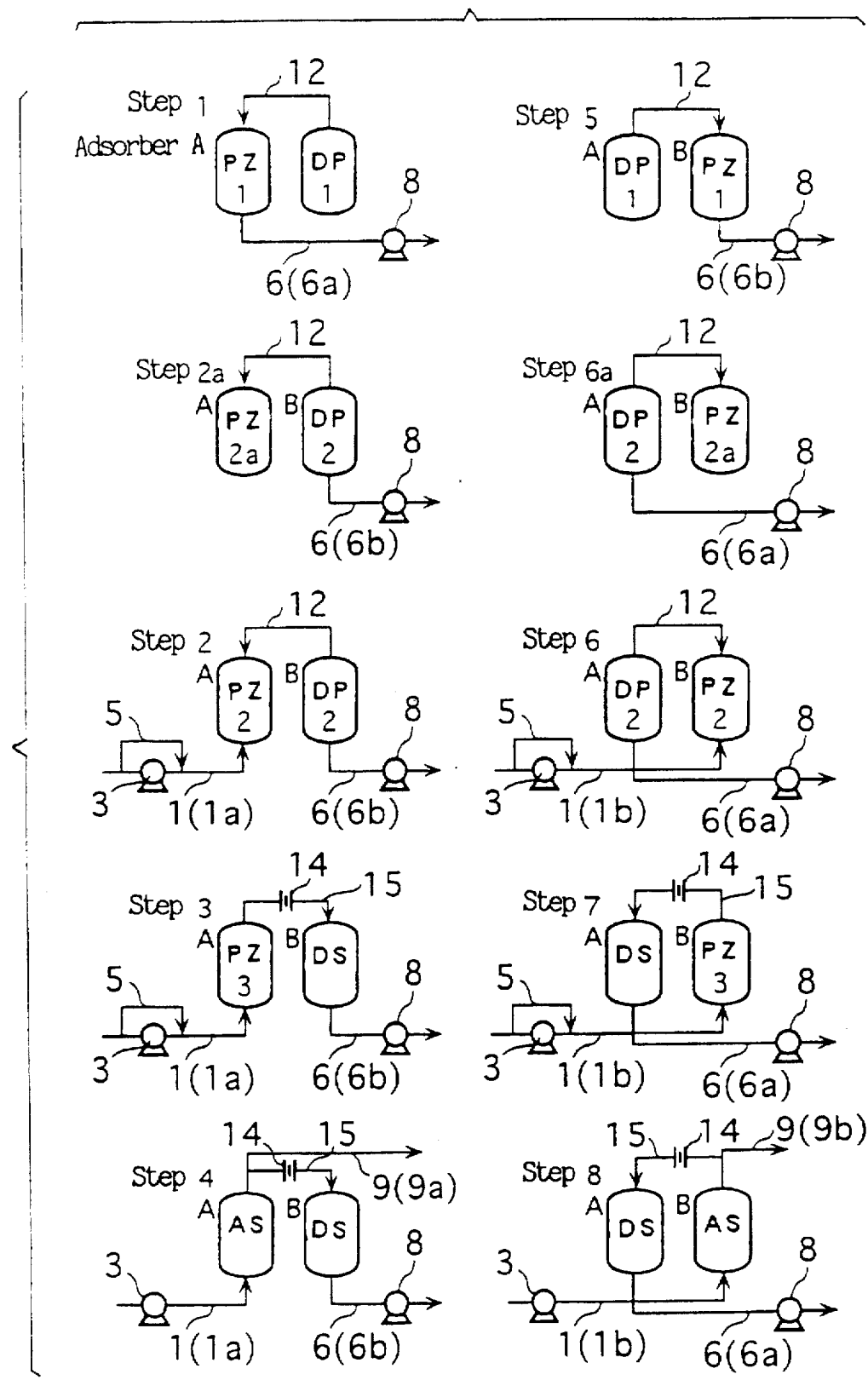
FIG. 6 is a flow diagram illustrating the respective process steps of Example 3 of the present invention.

FIGS. 4 and 5 correspond to Embodiment 2 of the present invention. FIG. 4 is a process chart which shows all of the process steps with time, whereas FIG. 5 is a flow diagram which illustrates the gas flow for the respective process steps. In Embodiment 2, again, the equalization bypass line 15 (FIG. 1) with the throttling device 14 is not provided.

Embodiment 2 is similar to Embodiment 1 above but differs therefrom in the following respects. Specifically, in Embodiment 2, the step 1 of Embodiment 1 is slightly shortened to insert step 2a before shifting to the step 2, and the step 5 of Embodiment 1 is shortened to insert step 6a before shifting to the step 6.

More specifically, in Embodiment 2, the time of the step 1 which is e.g. 10 seconds in Embodiment 1 is shortened to e.g. 8 seconds (compare FIGS. 2 and 4).

Further, in step 2a, only the switching valves 7b, 13 are held open. Due to this, remaining oxygen-enriched gas containing a small amount of nitrogen desorbed under depressurization at the tope of the adsorber B is introduced into the adsorber A via the pressure equalization line 12 for e.g. 2 seconds. As a result, the adsorber A is pressurized to e.g. 250–600 Torr (33–80 kPa). At this time, a small amount of nitrogen is effectively captured by the adsorbent near the top of the adsorber A in the same manner as in the step 1 of Embodiment 1.

Further, the operation of the adsorber B in the step 2a is the same as that of the subsequent step 2, together forming depressurization 2 of the adsorber B.

On the other hand, the step 6a corresponds to the above-described step 2a but differs therefrom only in that the respective operations of the adsorbers A, B are symmetrically exchanged.

In accordance with Embodiment 2 above, air was used as a gas mixture, and the same apparatus as in Embodiment 1 was operated with a cycle time of 120 seconds to achieve a maximum pressure (highest adsorption pressure) of 0.4 kg/cm$^2$G (141 kPa) and a minimum pressure (lowest desorption pressure) of 210 Torr (28 kPa). As a result, product oxygen was obtained with an oxygen concentration of 93% at a rate of 19.8 Nm$^3$/H. Further, the oxygen recovery yield was 53%.

(Embodiment 3)

FIG. 5 is a flow diagram which illustrates the gas flow for the respective process steps. In Embodiment 3, the equalization bypass line 15 (FIG. 1) with the throttling device 14 is provided.

Embodiment 3 is similar to Embodiment 2 above with respect to the basic process steps but differs therefrom slightly due to the provision of the equalization bypass line 15. Specifically, in the steps 3, 4, 7 and 8, the equalization bypass line 15 provided with the throttling device 14 (e.g. orifice) allows a small amount of oxygen-enriched gas to flow from one adsorber into the other adsorber due to a pressure difference between both adsorbers A, B, thereby assisting regeneration of the adsorbent in the other adsorber due to a washing effect.

It should be noted that since the pressure equalization line 12 having a far smaller flow resistance is also held conductive in the steps 1, 2a, 2, 5, 6a and 6 while the equalization bypass line 15 is always kept conductive, gas predominantly flows through the pressure equalization line 12. Therefore, the equalization bypass line 15 becomes meaningful only in the steps 3, 4, 7 and 8 where the pressure equalization line 12 is held non-conductive.

In accordance with Embodiment 3 above, the same apparatus as in Embodiment 2 except for the addition of the throttling device 14 was operated with a cycle time of 120 seconds to achieve a maximum pressure (highest adsorption pressure) of 0.4 kg/cm$^2$G (141 kPa) and a minimum pressure (lowest desorption pressure) of 220 Torr (29 kPa). As a result, product oxygen was obtained with an oxygen concentration of 93% at a rate of 20.2 Nm$^3$/H. Further, the oxygen recovery yield was 53%.

In Embodiment 3, air was used as a gas mixture, and the maximum pressure was 0.4 zkg/cm$^2$G (141 kPa) identically to Embodiment 2. However, the minimum pressure (final desorption pressure) of 220 Torr (29 kPa) was slightly higher than the minimum pressure of 210 Torr (28 kPa) in Embodiment 2. This reflects the fact that a small amount of gas flows into one adsorber undergoing desorption from the other adsorber via the equalization bypass line 15.

(COMPARATIVE EXAMPLE 1)

Figure 7:
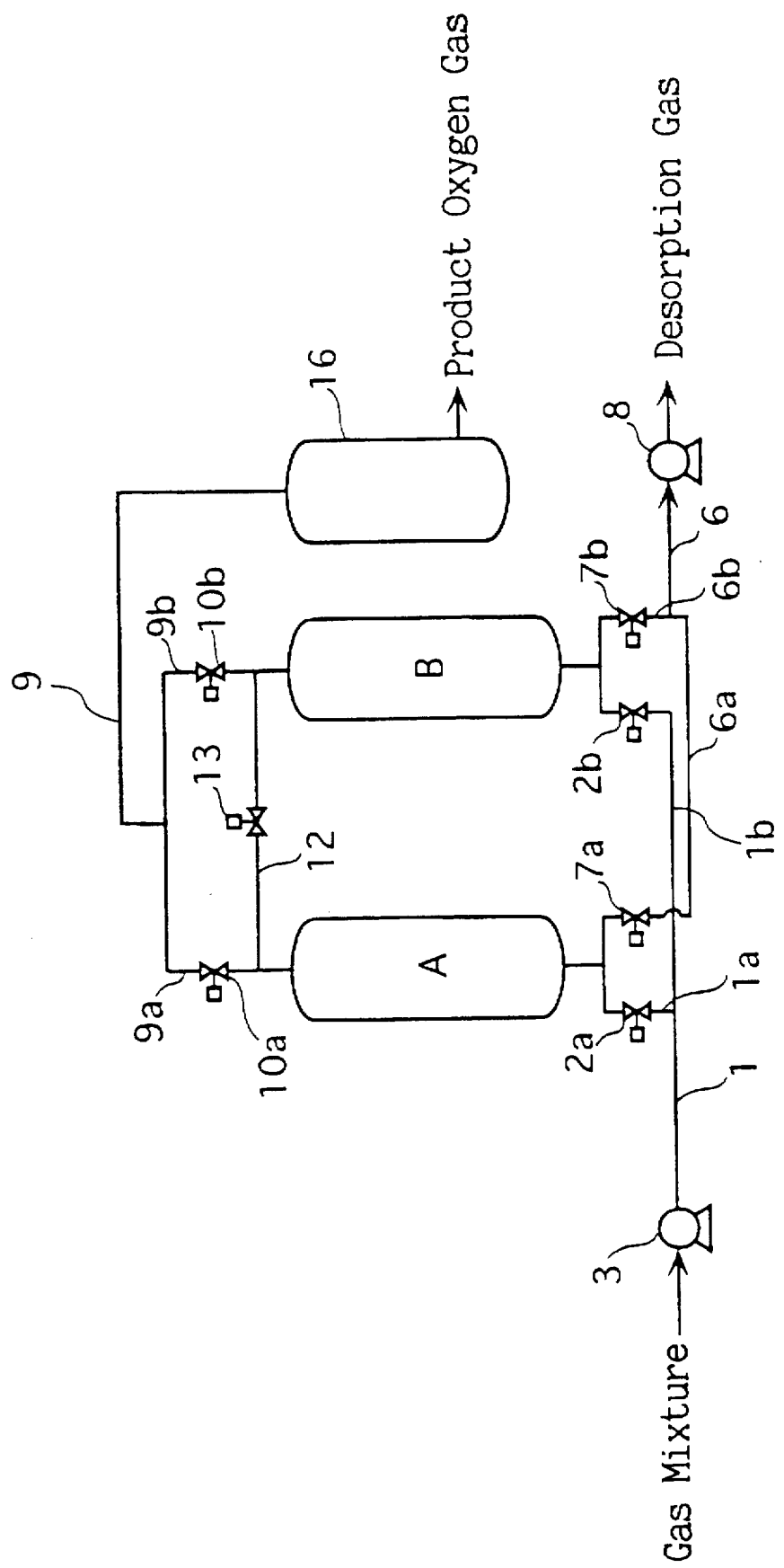
FIG. 7 is a view schematically showing the arrangement of an apparatus used in Comparative Example 1.

FIGS. 7 and 8 show Comparative Example 1. FIG. 7 is a view illustrating the arrangement of an apparatus used for performing the comparative example, whereas FIG. 8 is a process chart illustrating all of the process steps of the comparative example with time.

The apparatus shown in FIG. 7 is similar to the apparatus of FIG. 1. However, of the structural elements provided for the apparatus of FIG. 1, the feed bypass line 5 with the switching valve 4, the equalization bypass line 15 with the throttling device 14 and the reverse-flow preventing device 11 are not provided. Instead, the product oxygen gas take-out line 9 is connected to a product oxygen gas storage tank 16.

In Comparative Example 1, the apparatus of FIG. 7 is used for performing one cycle including the process steps shown in FIG. 8. Specifically, the adsorber A having completed desorption and the adsorber B having completed adsorption is brought into conduction through the pressure equalization line 12 for performing pressurization 1 with respect to the adsorber A and depressurization 1 for the adsorber B (10 seconds). Then, the adsorber A undergoes further pressurization wherein the product oxygen gas is allowed to flow reversely from the storage tank 16 via the take-out line 9 and the outlet line 9a(6 seconds), whereas the adsorber B undergoes desorption wherein the vacuum pump 8 evacuates via the discharge-side branch line 6b and the discharge line 6 (the desorption continuing for 50 seconds subsequently). Then, the blower 3 is actuated to supply the gas mixture (air) to the adsorber A via the feed line 1 and the feed-side branch line 1a, thereby taking out oxygen-enriched gas as product gas into the storage tank 16 via the outlet line 9a and the take-out line 9 (the adsorption being performed for 44 seconds until the desorption of the adsorber B is completed). The subsequent process steps are symmetrical repetition of the process steps for the adsorbers A and B, thereby completing a single cycle.

In FIG. 8, the abbreviation PPZ represents pressurization by the product oxygen gas.

In accordance with Comparative Example 1 above, a storage tank 16 having a capacity of 0.7 m$^3$ was added (the dimensions and the like of the other apparatus elements being identical to those of FIG. 1), a process with a cycle time of 120 seconds was carried out to achieve a maximum pressure (highest adsorption pressure) of 0.4 kg/cm$^2$G (141 kPa) and a minimum pressure (lowest desorption pressure) of 210 Torr (28 kPa). As a result, product oxygen was obtained with an oxygen concentration of 93% at a rate of 19.5 Nm$^3$/H. Further, the oxygen recovery yield was 45%.

Comparing the results of Comparative Example 1 with those of Embodiments 1–3, it is found that the rate of producing oxygen gas per unit time as well as the recovery yield of oxygen is greater in Embodiments 1–3 of the present invention than in Comparative Example 1. In particular, the recovery yield of oxygen is remarkably improved. These differences are mainly attributable to the fact that pressurization by pressure equalization between the adsorbers A, B is fully performed in Embodiments 1–3 of the present invention, as opposed to Comparative Example 1 wherein pressurization is performed by reverse flow of the product oxygen gas from the storage tank 16.

Comparative Example 1 above is not identical to the prior art disclosed in each of Japanese Patent Application Laid-open Nos. 1-236914, 2-119915, 4-222613 and 4-505448, but has a common basis in that pressurization is performed by reverse flow of the product oxygen gas from the storage tank 16. Thus, Comparative Example 1 may be considered to satisfactorily show the superiority of the present invention over the prior art.

(COMPARATIVE EXAMPLE 2)

FIG. 9 is a process chart which shows all of the process steps of Comparative Example 2 with time. It should be noted that Comparative Example 2 corresponds to the process disclosed in Japanese Patent Publication No. 6-170, but the process is performed with the use of the apparatus shown in FIG. 1 to uniformize the operating conditions as much as possible for ease of comparison. However, the feed bypass line 5 and the equalization bypass line 15 not disclosed in Japanese Patent Publication No. 6-170 are not provided.

The process of Comparative Example 2 is performed in the following manner. Specifically, the adsorber A having completed desorption and the adsorber B having completed adsorption is brought into conduction through the pressure equalization line 12 for performing pressurization 1 (9 seconds) with respect to the adsorber A and depressurization 1 for the adsorber B. At this time, however, the suction of the vacuum pump 8 is not applied to either of the adsorbers A, B. Then, the adsorber A undergoes pressurization 2 (9 seconds) with feed of the gas mixture (air) by the blower 3, whereas the adsorber B undergoes desorption by suction of the vacuum pump 8 (the desorption continuing for 36 seconds subsequently). Then, the blower 3 is actuated to supply the gas mixture to the adsorber A through the bottom thereof, thereby taking out oxygen-enriched gas as product gas from the top of the adsorber (the adsorption being performed for 27 seconds until the desorption of the adsorber B is completed). The subsequent process steps are symmetrical repetition of the process steps for the adsorbers A and B, thereby completing a single cycle.

In accordance with Comparative Example 2 above, the same apparatus as used in Embodiments 1 and 2 was used and operated with a cycle time of 90 seconds to achieve a maximum pressure (highest adsorption pressure) of 0.35 kg/cm$^2$G (136 kFa) and a minimum pressure (lowest desorption pressure) of 250 Torr (33 kPa). As a result, product oxygen was obtained with an oxygen concentration of 93% at a rate of 18.0 Nm$^3$/H. Further, the oxygen recovery yield was 45%.

The maximum pressure (adsorption pressure) in Comparative Example 2 was lower than that in Embodiments 1–3 because air feed by the blower 3 for a duration of 36 seconds was insufficient for satisfactorily increasing the adsorption pressure. Further, the minimum pressure (desorption pressure) in Comparative Example 2 was higher than that in Embodiments 1–3 because evacuation by the vacuum pump 8 for a duration of 36 seconds was insufficient for satisfactorily decreasing the desorption pressure.

Comparing the results of Comparative Example 2 with those of Embodiments 1–3, it is found that the rate of producing oxygen gas per unit time as well as the recovery yield of oxygen is greater in Embodiments 1–3 of the present invention than in Comparative Example 1. In particular, the recovery yield of oxygen is remarkably improved. These differences are attributable to the facts that pressure equalization between the adsorbers A, B (i.e., pressurization 1 and depressurization 1) is performed only once in Comparative Example 2 to result in insufficient pressure equalization by failure of effectively utilizing the oxygen-enriched gas from one adsorber for pressurization of the other adsorber, and that the vacuum pump 8 is held in idle state at the time of pressure equalization and therefore not utilized for nitrogen desorption from either adsorber.

We claim:

1. A process of recovering oxygen-enriched gas by pressure swing adsorption with use of a first and a second adsorbers each packed with an adsorbent which selectively adsorbs nitrogen from a gas mixture mainly containing nitrogen and oxygen, the process comprising:

step 1 wherein an outlet end of the first adsorber under a minimum pressure is brought into conduction with an outlet end of the second adsorber under a maximum pressure via a pressure equalization line to introduce remaining oxygen-enriched gas emitted from the second adsorber undergoing depressurization into the first adsorber for pressurization and recovery, desorbed nitrogen being evacuated through an inlet end of the first adsorber by a vacuum pump;

step 2 wherein while maintaining the conduction between the outlet end of the first adsorber and the outlet end of the second adsorber via the pressure equalization line, remaining oxygen-enriched gas further emitted from the second adsorber undergoing depressurization is introduced into the first adsorber for further pressurization and recovery, the gas mixture being introduced through the inlet end of the first adsorber, desorbed nitrogen being evacuated through an inlet end of the second adsorber by the vacuum pump;

step 3 wherein the outlet end of the first adsorber and the outlet end of the second adsorber are held closed, and the gas mixture is introduced through the inlet end of the first adsorber for further pressurization of the first adsorber, desorbed nitrogen being further evacuated through the inlet end of the second adsorber by the vacuum pump;

step 4 wherein the outlet end of the first adsorber is held open with the outlet end of the second adsorber held closed, and the gas mixture is introduced through the inlet end of the first adsorber for ultimate pressurization to the maximum pressure to take out oxygen-enriched gas from the outlet end of the first adsorber, desorbed nitrogen being evacuated through the inlet end of the second adsorber by the vacuum pump until the minimum pressure is reached;

step 5 wherein the outlet end of the first adsorber under the minimum pressure is brought again into conduction with the outlet end of the second adsorber under the maximum pressure via the pressure equalization line to introduce remaining oxygen-enriched gas emitted from the first adsorber undergoing depressurization into the second adsorber for pressurization and recovery, desorbed nitrogen being evacuated through the inlet end of the second adsorber by the vacuum pump;

step 6 wherein while maintaining the conduction between the outlet end of the first adsorber and the outlet end of the second adsorber via the pressure equalization line, remaining oxygen-enriched gas further emitted from the first adsorber undergoing depressurization is introduced into the second adsorber for further pressurization and recovery, the gas mixture being introduced through the inlet end of the second adsorber, desorbed nitrogen being evacuated through the inlet end of the first adsorber by the vacuum pump;

step 7 wherein the outlet end of the first adsorber and the outlet end of the second adsorber are held closed, and the gas mixture is introduced through the inlet end of the second adsorber for further pressurization of the second adsorber, desorbed nitrogen being further evacuated through the inlet end of the first adsorber by the vacuum pump; and step 8 wherein the outlet end of the second adsorber is held open with the outlet end of the first adsorber held closed, and the gas mixture is introduced through the inlet end of the second adsorber for ultimate pressurization to the maximum pressure to take out oxygen-enriched gas from the outlet end of the second adsorber, desorbed nitrogen being evacuated through the inlet end of the first adsorber by the vacuum pump until the minimum pressure is reached.

2. The process according to claim 1, further comprising: step 2a, between the step 1 and the step 2, wherein while maintaining the conduction between the outlet end of the first adsorber and the outlet end of the second adsorber via the pressure equalization line with the inlet end of the first adsorber held closed, the remaining oxygen-enriched gas further emitted from the second adsorber under depressurization is introduced into the first adsorber for further pressurization and recovery, desorbed nitrogen being evacuated through the inlet end of the second adsorber by the vacuum pump; and step 6a, between the step 5 and the step 6, wherein while maintaining the conduction between the outlet end of the first adsorber and the outlet end of the second adsorber via the pressure equalization line with the inlet end of the second adsorber held closed, the remaining oxygen-enriched gas further emitted from the first adsorber under depressurization is introduced into the second adsorber for further pressurization and recovery, desorbed nitrogen being evacuated through the inlet end of the first adsorber by the vacuum pump.

3. The process according to claim 1, wherein the outlet end of the first adsorber and the outlet end of the second adsorber are always held in mutual conduction via an equalization bypass line provided with a throttling device.

4. The process according to claim 1, wherein feeding of the gas mixture to the adsorber undergoing pressurization is performed both by forcible feed utilizing a pressurizing supply means and by natural feed utilizing atmospheric pressure in the steps 2, 3, 6 and 7.

5. The process according to claim 1, wherein the gas mixture is air.

* * * * *